United States Patent
Pelosi

(10) Patent No.: US 7,405,726 B2
(45) Date of Patent: Jul. 29, 2008

(54) 3D CURSOR OR JOYSTICK DEVICE

(75) Inventor: Michael J. Pelosi, Maui, HI (US)

(73) Assignee: Maui Innovative Peripherals, Inc., Puunene, HI (US)

( * ) Notice: Subject to any disclaimer, the term of this patent is extended or adjusted under 35 U.S.C. 154(b) by 361 days.

(21) Appl. No.: 10/160,657

(22) Filed: May 31, 2002

(65) Prior Publication Data

US 2002/0175897 A1 Nov. 28, 2002

Related U.S. Application Data

(62) Division of application No. 09/648,192, filed on Aug. 23, 2000, now Pat. No. 6,424,410.

(60) Provisional application No. 60/151,091, filed on Aug. 27, 1999, provisional application No. 60/164,812, filed on Nov. 10, 1999.

(51) Int. Cl.
*G09G 5/08* (2006.01)
*G06F 3/033* (2006.01)
*G01B 11/26* (2006.01)
*G01C 1/00* (2006.01)

(52) U.S. Cl. .................. 345/158; 345/161; 356/152.1

(58) Field of Classification Search .............. 345/6–8, 345/207, 156–184; 356/152.1–152.3
See application file for complete search history.

(56) References Cited

U.S. PATENT DOCUMENTS 4,209,255 A * 6/1980 Heynau et al. ............ 356/152

(Continued)

OTHER PUBLICATIONS

3D-Bird, Acension Technology Corporation, product literature from www.ascension-tech.com, circa 2000.

(Continued)

*Primary Examiner*—Sumati Lefkowitz
*Assistant Examiner*—Srilakshmi K Kumar
(74) *Attorney, Agent, or Firm*—Leighton K. Chong

(57) ABSTRACT

A 3D cursor or joystick device and control method employs a complementary pair of emitter/detector units, one worn on a part of a user's body (e.g., the head) and the other mounted in a stationary position on a display monitor facing the user. Each unit has an array of photovoltaic (PV) cells centered on a normal axis and an infrared diode for emitting a light beam on the normal axis. Each photodetectors array receives the infrared beam from the other unit and provides output signals representing the light intensities of the received beam on the PV cells. The PV cell response signals of the complementary units are used together to calculate the position and angular orientation of the user-worn unit relative to the stationary unit. The position and angle values are used by a software device driver installed on a computer to control 3D navigation functions of the associated application program on the computer. The system can be used for playing interctive 3D games, and also used for hands-free control in a wide range of other applications and environments, such as to control flight motions in a simulator or cockpit of an aircraft, or the command center of a naval vessel, spaceship, land vehicle, etc., for disabled persons to provide hands-free input to a computer, motorized wheelchair, prosthetic device, etc., and for controlling various functions in an industrial environment, such as guiding machine-assisted movement, or in CAD design, architectural, medical graphics, virtual reality, and other applications.

24 Claims, 9 Drawing Sheets

U.S. PATENT DOCUMENTS

| | | | |
|---|---|---|---|
| 4,649,504 A | | 3/1987 | Krouglicof |
| 5,187,540 A | | 2/1993 | Morrison |
| 5,227,985 A | | 7/1993 | DeMenthon |
| 5,297,061 A | | 3/1994 | DeMentheon |
| 5,367,614 A | * | 11/1994 | Bisey .......................... 395/119 |
| 5,442,734 A | * | 8/1995 | Murakami et al. .......... 395/127 |
| 5,461,478 A | | 10/1995 | Sakakibara |
| 5,574,836 A | | 11/1996 | Broemmelsiek |
| 5,767,524 A | * | 6/1998 | Barbier et al. ......... 250/559.29 |
| 5,856,844 A | | 1/1999 | Batterman |
| 5,884,239 A | | 3/1999 | Romanik |
| 5,889,505 A | | 3/1999 | Toyama |
| 5,926,264 A | | 7/1999 | Beale |

OTHER PUBLICATIONS

Quick-Glance, EyeTech Digital Systems, Inc., product literature from www.eyetechds.com, circa Apr. 2000.

VFX3D, Interactive Imaging Systems, Inc., product literature from www.iisvr.com, circa 1998-99.

IS-600 Mark 2, InterTrax/i-glasses, InterSense, Inc., product literature from www.isense.com, circa Apr. 2000.

5th Glove, CyberTrack, CyberEye, General Realty Co., product literature from www.ireality.com, no date, circa 2000.

3D Mouse & Head Tracker, Space Mouse, Logitech Corp., product literature from www.qwualixdirect.com, no date, circa 2000.

HeadMouse, Origin Instruments Corp., product literature from www.orin.com, circa May 2000.

Star*Trak, Fastrak, Isotrak II, Polhemus, Inc., product literature from www.polhemus.com, circa Sep. 1996, 1999.

Head Tracker 2000, Synapse Adaptive, product literature from www.synapseadaptive.com, circa 2000.

* cited by examiner

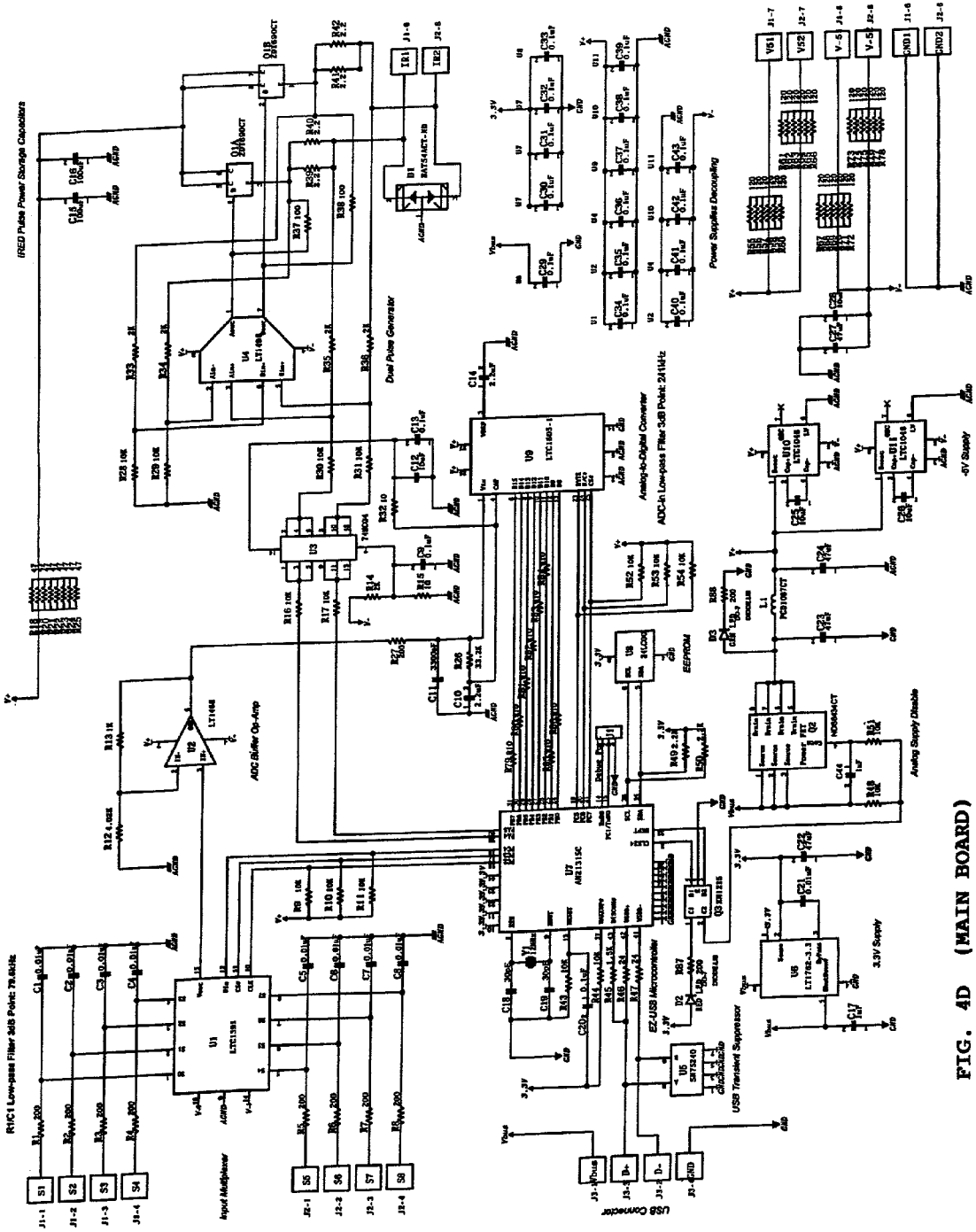
FIG. 4D (MAIN BOARD)

3D CURSOR OR JOYSTICK DEVICE

This divisional U.S. Patent Application claims the benefit of the priority filing date of U.S. patent application 09/648,192, filed on Aug. 23, 2000, in the name of the same inventor, entitled "3D Navigation Using Complementary Head-Mounted and Stationary Infrared Beam Detection Units", now issued as U.S. Pat. No. 6,424,410.

This patent application claims the priority of U.S. Provisional Application No. 60/151,091 filed on Aug. 27, 1999, entitled "3D Graphics World Navigation Headset", and U.S. Provisional Application No. 60/164,812 filed on Nov. 10, 1999, entitled "3D World Navigation Headset", by the same inventor.

FIELD OF THE INVENTION

This invention relates to a system for providing control inputs based upon determining the position and orientation of a part of the body of a user, such as the head, in three-dimensional (3D) space, and using the inputs to control a pointer or cursor on a 3D display, an instrument in 3D space, the perspective of a display (camera angle or view) of a 3D image or scene, etc. In particular, the invention is directed to a low-cost, accurate, and reliable system that can be used as a hands-free input device to play interactive 3D games on a computer.

BACKGROUND OF THE INVENTION

With the proliferation of 3D graphics hardware for desktop computers and the increasing sophistication and power of 3D software, especially in the character combat genre of games, superior methods of character control and manipulation are desired and required as compared to the current joystick, keyboard, and mouse. The current peripheral input devices are inadequate for several reasons. First, a user must learn and remember a separate set of commands for each game or software program. For example, the "Up" arrow key may move the user forward in one game whereas the "F" key may do the same in another. This is cumbersome and burdensome for the user. Secondly, there is no logical correlation between pressing a key or button and directing movement, camera angle, or pointing on a display. It is more natural to the user, and would enhance psychological immersion into playing a game, if the user can control movement in the game by physically moving a part of their body in a similar direction in real time.

Ideally, a user would prefer to control a game character to navigate in 3D space or change what the character sees in as similar a manner as possible to controlling the movement of their own head or other part of their body. Also, it would be of a great benefit if the navigational and perspective changing method could free up the user's hands for other, simultaneous input. For example, if the user could move their character without the use of the hands, then their hands could be used for combat-type input on a keyboard, game controller, or other input device.

Prior 3D head input systems suitable for computer cursoring or game control have relied on detection of signals transmitted from a head-mounted unit to a detection unit in order to calculate the position and/or orientation of the head. For example, in U.S. Pat. No. 5,367,614 to Bisey, ultrasonic sensors arranged in a triangular configuration around a computer monitor measure the arrival times of a pulse signal transmitted from a head unit in order to compute relative distances of the head unit along 3 axes and use the computed data to rotate a 3D image on the screen in the same way the user would move their head to view an object in nature. In U.S. Pat. No. 5,574,836 to Broemmelsiek, detection of the head shift of a user by an ultrasonic or infrared detector is used to generate a corresponding parallax or perspective shift in the display of a 3D object. In U.S. Pat. No. 5,926,264 to Beale, a 4-division photosensor array detects the relative intensities of a light beam from a source LED reflected by a head-mounted reflector in order to derive the orientation of the user's head and correspondingly control a pointer on a computer screen.

These prior 3D head input systems have typically relied on detection of relative light beam intensities or arrival times of transmitted signals from a head unit to a receiver unit in order to calculate by standard triangulation algorithms the relative position coordinates and/or relative angular orientation of the user's head. Such "one-way" transmitter/receiver detection systems have the limitation that they can be used to compute the head unit's position or its orientation, but not both at the same time with accurate results. Computational tradeoffs are made to obtain primarily position information or orientation information, but cannot obtain accurate information in "six degrees" of freedom, i.e., on linear axes (X, Y, Z) and rotational axes (yaw, pitch, roll) at the same time. More complex systems have been devised for accurate 6-degrees-of-freedom (so-called 6DoF) calculations, but these have required expensive and complex equipment for optical scanning of a three-dimensional target array worn or held by the user from multiple camera angles, e.g., as described in U.S. Pat. Nos. 5,889,505 to Toyama, 5,884,239 to Romanik, 5,461,478 to Sakakibara, 5,227,985 to DeMentheon, 5,187,540 to Morrison, and 4,649,504 to Krouglicof et al.

It has become important with increasing sophistication of 3D games and other environments (such as computer aided design (CAD), simulation, or virtual reality environments) for the user to be able to change movement or position within the environment (X, Y, Z coordinate location within the 3D world) and also to control and change the field-of-view within the environment (often referred to as "camera angle"). Also of importance is the ability of the user to perform such navigational or change of camera angle functions while keeping their hands free for manipulation tasks within the environment. For example, in CAD design, a design engineer may need to move the view around a displayed object while at the same time using a mouse or commands from a keyboard to add, delete, or modify components with the object. As computing power continues to increase while costs decrease for increasingly sophisticated 3D applications programs in an expanding range of environments, an accurate, low-cost, 3D navigation system with 6DoF control suitable for "hands free" computer input is increasingly needed.

SUMMARY OF THE INVENTION

Accordingly, it is a principal object of the present invention to provide a system for 3D navigation by a user on linear and rotational axes on a display that is reliable, simple to manufacture, and low in cost. It is a particular object of the invention that the 3D navigation system can be operated by a simple unit worn on the user's head in order to leave the user's hands free for simultaneous input in interactive games or manipulation of other controls.

In an apparatus embodying the present invention, a 3D navigation system comprises a complementary pair of emitter/detector units, one of which is worn on a part of a user's body and the other of which is mounted in a stationary position on or adjacent to a display screen facing the user, wherein each emitter/detector unit of the complementary pair has an infrared emitter element for emitting a cone-shaped beam along the unit's normal axis in a direction toward the other unit, and an array of photodetectors arranged around the infrared emitter element having their detection surfaces facing outwardly from the unit's normal axis so as to receive the infrared cone-shaped beam from the other unit on its detection surfaces and provide an output of output signals representing light intensities of the received beam on the respective detection surfaces, and a processing unit for receiving the output signals from the photodetector array of the user-worn unit and the output signals from the photodetector array of the stationary unit and using them together as combined inputs to calculate position information and angular orientation information representing the position and orientation of the user-worn unit on linear and rotational axes relative to the stationary unit. The invention also encompasses the related method of using complementary, user-worn and stationary emitter/detector units for 3D navigation control.

In a preferred embodiment, the 3D navigation apparatus consists of a user-worn headset unit and a monitor-mounted unit coupled to a processor module. Each unit has an infrared emitter element aligned on a center (normal) axis and a ring of photodetector cells angled outwardly around the center axis of the unit. The processor module includes a processor motherboard and IC circuitry, links to the complementary emitter/detector units, and cable or wireless port to connect the device outputs to a computer COM port, parallel port, or other communication input channel, such as a USB connector. The monitor unit can be integrated with the processor module, or can be a separate unit mounted on the frame of a display monitor.

The photodetector cells are preferably 4 silicon photovoltaic (PV) cells or photodiodes spaced symmetrically around a central infrared emitter element, and angled outwardly at 30 to 45 degrees to the central axis of the unit. The detector surfaces of the PV cells or photodiodes perferably have filter elements superimposed on them to filter out ambient background light from the infrared light beam. The infrared emitter element preferably has a peak spectral output in the 900 nanometer (nm) range corresponding to the peak sensitivity range of the PV cells. Both the user-worn and stationary emitter/detector units have an identical construction and components in order to lower the cost of manufacture in quantity.

The outputs of the PV cells or photodiodes of each unit are converted to voltage signals through the use of on-board amplifier circuitry. The PV voltage signals are transmitted to the processor module and converted to binary data using an analog-to-digital integrated circuit (IC) device. The output binary data are transmitted to the associated computer, via the COM port, USB, or other communications channel, to device driver software running on the computer. The device driver software uses the input values to compute the X, Y, Z coordinates and angular orientation of the user's headset unit relative to the monitor unit and uses the resulting position and orientation angle values to control 3D navigation functions of the associated application program (game, CAD program, etc.) running on the computer.

The 3D navigation system of the invention can also be used for hands-free control in a wide range of other applications and environments besides games. It may be used to control flight motions and display views in a simulator or cockpit of an aircraft, or the command center of a naval vessel, spaceship, land vehicle, etc. Leaving the user's hands free allows for simultaneous control of other functions, such as manipulation of controls on a control panel or the firing of weapons. For disabled persons, the hands-free 3D navigation system can be used to control input to a computer, the movements of a motorized wheelchair, prosthetic device, and other assistance devices for the disabled. The 3D navigation system may also be used to control various functions in an industrial environment, for example, guiding the machine-assisted movement and orientation of a workpiece while leaving the operator's hands free to manipulate process equipment applied to the workpiece (welding, painting, laminating, etc.). The system can similarly be used in CAD design, architectural, medical graphics, virtual reality, and other commercial applications. For example, use of the headset with a virtual reality display can allow a 3D "tour" to be taken through construction sites, buildings, medical diagnostic images, and simulated or artificial environments.

Other objects, features, and advantages of the present invention will be described in further detail below, with reference to the following drawings:

BRIEF DESCRIPTION OF DRAWINGS

FIG. 4D is a circuit diagram of the main board IC of the processor module.

DETAILED DESCRIPTION OF INVENTION

A fundamental principle of the present invention is the use of complementary (two-way) position/angle detection to provide a sufficient set of determinative variables from which the coordinate position along linear axes and angular orientation along rotational axes of a movable unit can be determined relative to a stationary one. The movable unit is placed or worn a movable part of the user's body so that its movements can be used in a lifelike or natural manner for 3D navigation control of a cursor, instrument, character, etc., on a display of an associated computer running the corresponding 3D application program. In the following detailed description, a preferred embodiment of the invention is described in which identical infrared-emitter and photovoltaic-cell-array detector units are worn on the user's head and mounted on top of a display monitor. However, it is to be understood that many other variations may be used and still be encompassed within the guiding principles of the invention.

Figure 1:
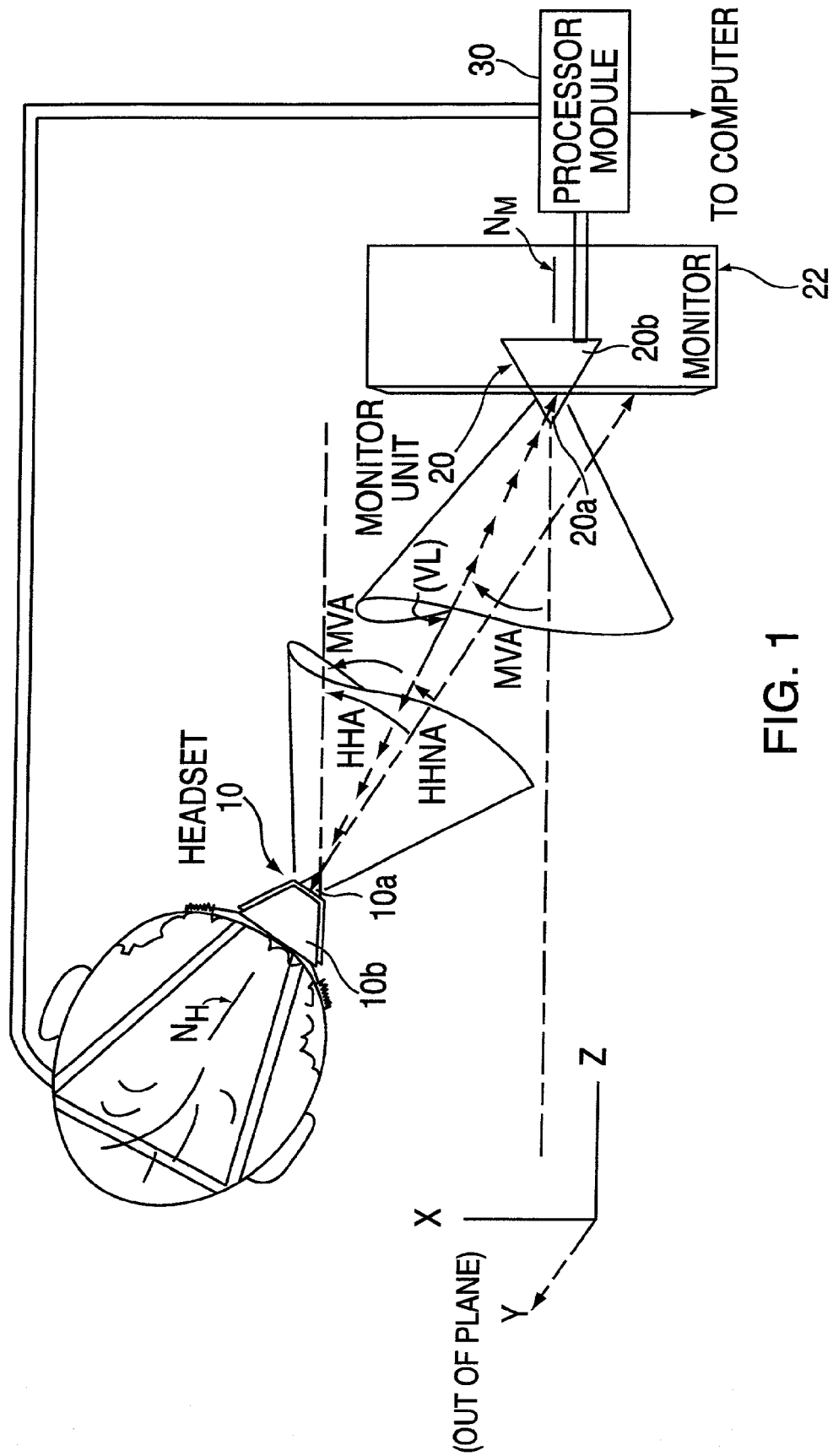
FIG. 1 is a schematic illustration of the operational concept underlying the complementary detection principle of the invention.

Referring to FIG. 1, the operational concept underlying the complementary (two-way) detection principle of the invention is illustrated. A movable emitter/detector unit is mounted (worn) on a movable part of the user's body (head), and is hereinafter referred to as the headset unit 10. Headset unit 10 is comprised of an infrared emitter element 10a aligned with a Headset Normal Axis $N_H$ and a photovoltaic (PV) cell or photodiode array 10b spaced symmetrically around the Headset Normal Axis $N_H$. A stationary emitter/detector unit, hereinafter referred to as the monitor unit 20, is positioned on a display monitor 22 having a screen for displaying a game, 3D graphics or other display environment which the user is controlling or interacting with. Monitor unit 20 is likewise comprised of an infrared emitter element 20a and a PV cell or photodiode array 20b aligned with a Monitor Normal Axis $N_M$.

Each emitter/detector unit emits a cone of light, such as an infrared beam, which is detected by the array of detector elements on the complementary unit. The detection of light intensities falling on the array of detector elements of each receiving unit are measured by an on-board amplifier circuit as voltage values which are output as detection response values to a processor module 30 for the device. The processor module 30 converts the detection response values through an IC circuit to binary device output data, and transmits the binary data to a computer which runs a 3D application program that uses the 3D navigation device. The computer is installed with a software device driver which uses the device output data to calculate the coordinate position and orientation angles of the movable unit relative of the stationary unit, and interprets the device outputs according to a defined set of function controls for movement and changing of camera angle in the 3D application program. The function controls are applied to the 3D application program and cause the resulting changes to the display or interactive effects with the user.

In the plan view of FIG. 1, the complementary units are depicted as lying in a honzontal plane defined by orthogonal linear axes X and Z. The headset unit 10 has a center Headset Normal Axis $N_H$ which is pointed in the direction that the user's head is pointed toward. The monitor unit 20 has a center Monitor Normal Axis $N_M$ which is fixed at a position centered on the display and aligned perpendicular to the plane of the display screen. A line VL extending from the detector array 10b of the headset unit to the detector array 20b of the monitor unit defines the viewing angle at which each unit "sees" the other unit relative to its normal axis. The Monitor Normal Axis $N_M$ is assumed to be aligned with the Z axis. Therefore, rotational angles measured from the X axis are referred to herein as "vertical angles", and rotational angles measured from the Y axis (perpendicular to the plane of the drawing) are referred to as "vertical angles".

With respect to the X-Z plane depicted in the drawing, the angle at which the headset unit "sees" the beam of the monitor unit in the left-right direction in the X-Z plane is referred to as the Headset Horizontal Normal Angle HHNA (relative to its normal axis), and the angle at which the monitor unit "sees" the beam of the headset unit in the X-Z plane is referred to as the Monitor Horizontal Angle MHA. Similarly, the angle at which the headset unit "sees" the beam of the monitor unit in the up-down direction perpendicular to the X-Z plane is referred to as the Headset Vertical Normal Angle HVNA (relative to its normal axis), and the angle at which the monitor unit "sees" the beam of the headset unit perpendicular to the X-Z plane is referred to as the Monitor Vertical Angle MVA. The detection response values of the two complementary units are used to calculate these angular orientation values and the distance of the headset unit 10 from the monitor unit 20. These values are then translated into final values for the headset vertical and horizontal orientation angles HHA and HVA on the X and Y rotational axes and the headset coordinate values on the X, Y, Z coordinate axes.

The above-described methodology represents detection in five degrees of freedom (X, Y, Z linear axes and X and Y rotational axes). The ergonomics of wearing a headset might make it uncomfortable for the user to provide a sixth control input based upon tilting the head relative to the Z rotational axis. However, in other environments where the movable unit may be positioned on a more mobile part of the body, such as the wrist, or on a fully movable object, such as a robot arm, fill 6DoF detection can be obtained by adding a tilt sensor to the movable unit to detect the rotation angle around the Z axis.

Figure 2B:
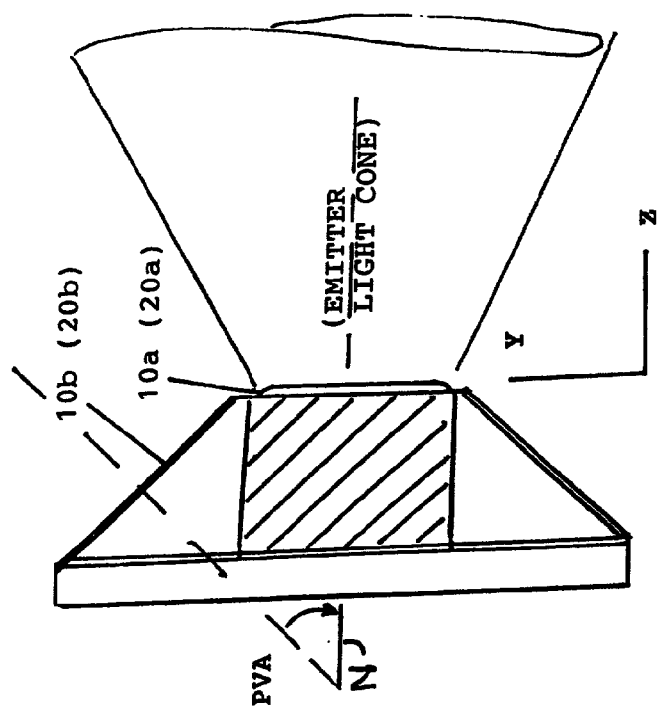
FIGS. 2A and 2B are diagrams of a preferred embodiment of the emitter/detector units shown in plan and side views, respectively.
Figure 2A:
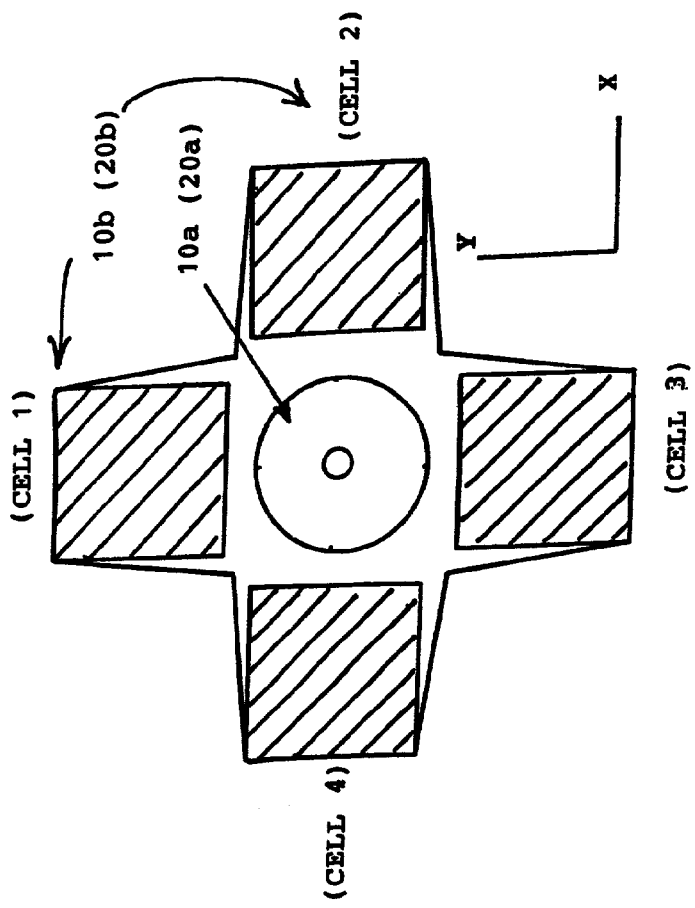

In FIGS. 2A and 2B, a preferred embodiment for the emitter/detector units is shown in plan and side views, respectively. Each emitter/detector unit has an emitter element 10a (20a) surrounded by an array of PV cells 10b (20b) arranged symmetrically about the unit's normal axis N. The emitter element emits a cone-shaped light beam centered on the unit's normal axis N in a direction toward the other unit. The light beam from the other unit impacts on the surfaces of the PV cells of the unit, and the differential ratios of light intensities impacting on different pairs of PV cells are measured and used to calculate the position and angle of the source beam of the other unit relative to the one unit. The PV cells are inclined at an outward angle PVA relative to the unit's normal axis N in order to take advantage of the nearly ideal linear detection response characteristics of the PV cells over a wide angle range (from nominal 100% at dead center to about 30% response at 45 degree angle of incidence). The inclined angle also provides a wide aspect ratio within which one unit can be detected by the other. The PV cell inclination angle may be suitably chosen in the range of 30 to 45 degrees to the nornal axis. The PV cells also have a nearly ideal response to distance, as it varies following the inverse square of distance of the light source. Suitable silicon PV cells are sold under the product name MultiCrystalline PhotoVoltaic Cells, by Siemens GmbH, of Hamburg, Germany.

In the preferred embodiment, the emitter element may be a single infrared (IRED) diode in the center of the unit. For the typical distance range of about 6 inches to about 4 feet within which the user's head might be moved while sitting in front of a display monitor, an IRED diode such as one sold under the product name OD100 by Opto-Diode Corp., Newberry park, Calif., may be used. The IRED diode is made of gallium arsenide material, has a power output of about 50 milliwatts (mw) in the 880 to 900 nm light frequency range, and provides a gaussian beam shape that is nearly symmetric, making it satisfactory for typical use in a game environment. The infrared light is completely invisible and is not a distraction to the user. The IRED devices are relatively inexpensive (in the $2 to $3 range in bulk), present no health risk whatsoever, and in the power ranges needed for this application do not emit noticeable amounts of heat. Also, these devices are known to be very rugged and long-lasting, as they are commonly used in TV remote controls. A higher quality but more expensive IRED diode with an optical quality lens for projecting a symmetric beam shape is expected to be offered under the product name Black Ceramic by the is same company. For environments in which a user interacts with a TV at typical TV viewing ranges of 2 to 20 feet, a higher powered IRED can be used As an alternative, the emitter element may be made of a cluster of lower-powered, lower cost diodes. For example, a cluster of 7 low-power infrared diodes may be arranged in hexagonal configuration with one in the center to cast an approximately symmetric beam shape. These IREDs may have an output of 20-40 mw with a peak spectral output in the 880 to 900 nm range. The honeycomb-shaped cluster produces a light beam cone that has a relatively smooth drop-off in output across the light cone width. The IREDs are inexpensive (less than $1 each in bulk), but have to be assembled in the cluster shape.

As shown in FIGS. 2A and 2B, a preferred arrangement of the detector element is 4 PV cells in a cross configuration, with the cells inclined at a 45 degree angle (PVA) facing outwardly from the unit's normal axis N. The PV cells may be common crystalline photovoltaic cells cut in rectangular shape of about 1.5 cm×1 cm. Although other silicon-based light sensing devices are available (such as phototransistors, photodiodes, and photoresistors), the sensitivity and near linear response of the PV cell over a wide range of light incidence angles is found to yield superior results. By mounting the 4 cells around the emitter element at an inclined angle to the unit's normal axis outwardly from each other, distinct differential ratios for incident light between pairs of cells can be measured. In this example, primary measurements can be taken over the up/down angle range (rotation about the X axis) can be taken between Cells 1 and 3, and primary measurements can be taken over the left/right angle range (rotation about the Y axis) between Cells 2 and 4. In the up/down direction, more light on the top Cell 1 than on the bottom Cell 3 would correlate to a positive X-axis rotational angle, etc. Secondary measurements can also be taken between Cells 1 and 2, Cells 1 and 4, Cells 3 and 2, and Cells 3 and 4, and use to improve the correlation of measured values to the light source angle. While the drawings show the PV cells oriented upright, they may be oriented instead at a 45 degree X-configuration to reduce the vertical height of the unit when worn, for example, on the forehead of the user. The 45-degree orientation does not change the calculation of position and angle values from PV cell response ratios, but only requires a correction for 45 degrees of rotation in the final angle values.

Figure 3A:
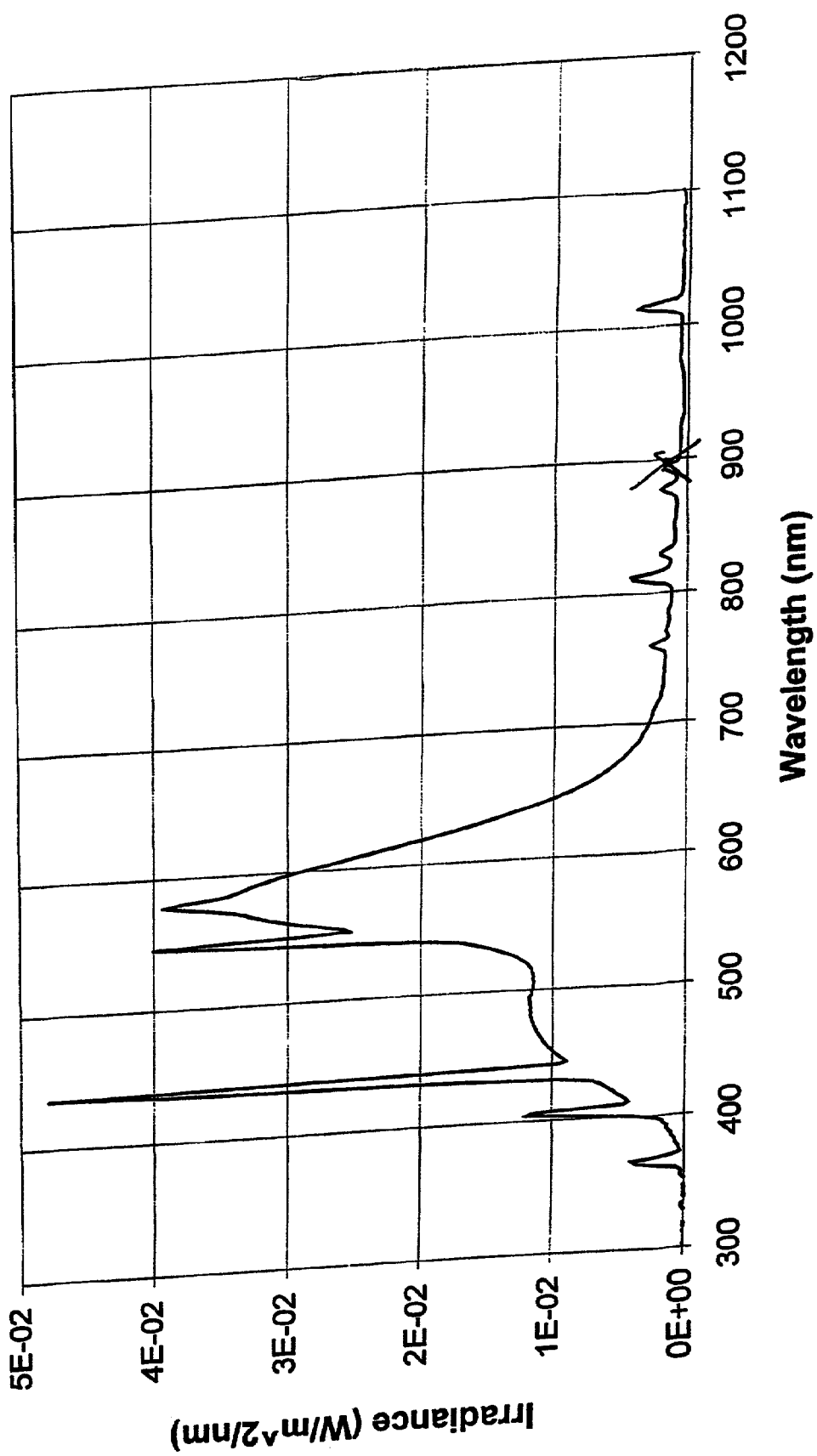
FIG. 3A is a chart of the spectral content of standard indoor fluorescent lights, showing that they have very little emissions in the 900 mn and greater range.
Figure 3B:
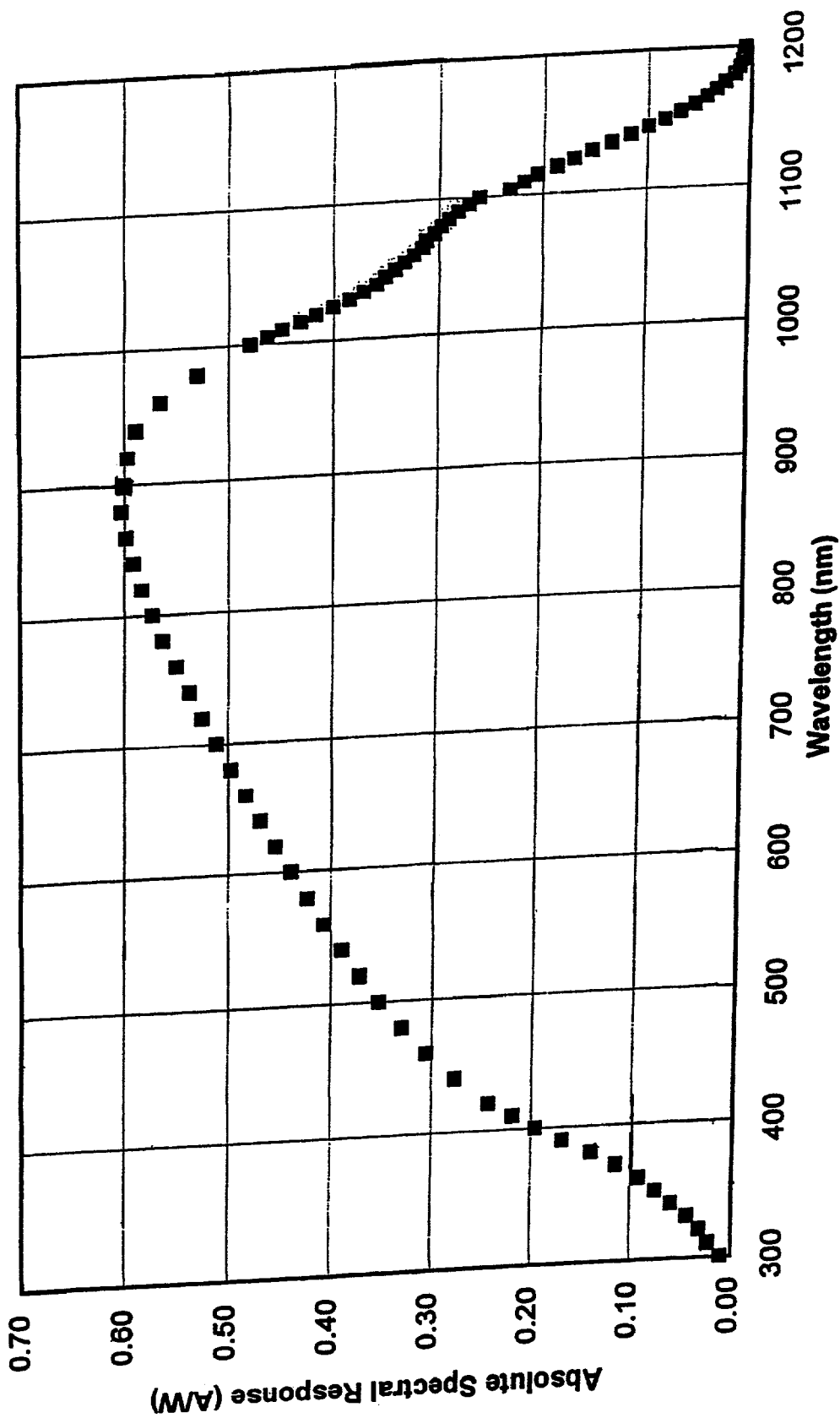
FIG. 3B is a chart of the spectral response of common silicon photovoltaic cells, showing that they have a peak output sensitivity close to the 900 mn range.

In FIG. 3A, the spectral profile of typical indoor fluorescent lights is shown having a peak output in the 600 nm range and almost no output in the 900 nm range. In contrast, common silicon photovoltaic cells have a peak output close to 900 nm, as shown in the chart in FIG. 3B (reproduced with permission from Sandia National Labs Photovoltaic Systems Department). Thus, pairing IREDs with peak spectral output in the nm range with PV cells having peak spectral response in the 900 nm range provides an ideal emitter/detector combination that can be used for typical indoor lighting conditions. By placing high-pass infrared filters over the PV cells, over 90% of light below the 900 nm range can be cut off, so that most ambient light in indoor room conditions (such as from fluorescent and incandescent lights) would be blocked from producing unwanted signal noise in the sensing cells. A suitable infrared filter is sold under the product name Clarex™ NIR-84 Filter, having peak transmissivity at 840 nm, by Nitto Jushi Kogyo Co., Ltd., Tokyo, Japan.

To further eliminate the effect of unwanted ambient light on the PV cell response, it is found that pulsing the IREDs on and off with pulse driving circuitry and subtracting the IRED-off value from the IRED-on value will eliminate unwanted light values to the point of irrelevance. When the IREDs are off, the cells are only sensing the effect of room and other ambient light. Then when the IREDs are on, they produce the additional light signal to the PV cells. By subtracting the Off signal level from the On value, the remainder is very closely only the light signal attributable to the IREDs light beam. Even with very bright indoor light, this method of pulsing the IREDs was found to perform very well. A further improvement can be obtained by pulsing the IREDs at a frequency multiple of the standard utility sine wave frequency of 60 Hertz. Indoor lights such as fluorescent lights vary in light output as the utility sine wave produces varying amount of positive and negative AC voltage. By sensing at a multiple (e.g., 2 times per sine wave, or 120 times per second) of the sine wave, the effect of ambient light variations due to varying utility power is further eliminated. This works by sensing twice per sine wave (once with the IREDs off, once with them on), then subtracting the off value from the on value. The results can be averaged over blocks of, e.g., 5 measurements for the software outputs. This produces device output information about 12 times per second. The IRED devices take well to pulsing at many-times-per-second intervals. IRED manufacturer ratings indicate pulsed IREDs can handle much more current (and produce a stronger signal), and have a longer lifetime, in the pulsed mode.

The PV cell currents generated by the PV cell responses are fed to an on-board circuit of operational amplifiers with low-pass filtering which output voltage signals representing the current levels. In FIG. 1, the PV cell output voltage signals for each unit are fed to a common processor module 30 where they are then converted into binary device output values. The emitter/detector units are coupled to the processor module 30 by wiring cables which also carry power supply to the units. Alternatively, the headset or movable unit may be battery powered and transmit its output to the processor module by a wireless (RF) link. The processor module 30 is connected by cable to a communication port of the associated computer running the application program that uses the 3D navigation device outputs. A software device driver program installed for the 3D navigation device with the computer performs the final computation of a suitable position/angle solution to derive the position and angle values used by the application program.

Example: Construction of Emitter/Detector Units and Processor Module

As an example of a preferred construction of the emitter/detector unit, the headset and monitor units are identically formed with 4 PV cells mounted on a X-shaped base of molded plastic with an OD-100 IRED mounted in the center. Connection leads (cathode and anode) are attached to the IRED from the rear, and lead wires are attached to the 4 PV cells. The headset unit is mounted to a headband of Nylon or Kevlar and positioned at the center of the user's forehead. The monitor unit is mounted by a clamp or adhesive pad to the top front-facing panel of the display monitor. The monitor unit's PV cell leads and power supply line are wired to the processor module, which is a small unit containing an IC motherboard and power supply that can be placed on the desktop or other suitable position. The headset unit's leads are also coupled to the processor module by a connecting cable. Alternatively, the headset unit may be battery powered, and the PV cell response values are transmitted to the processor module by an RF transmitter.

Figure 4A:
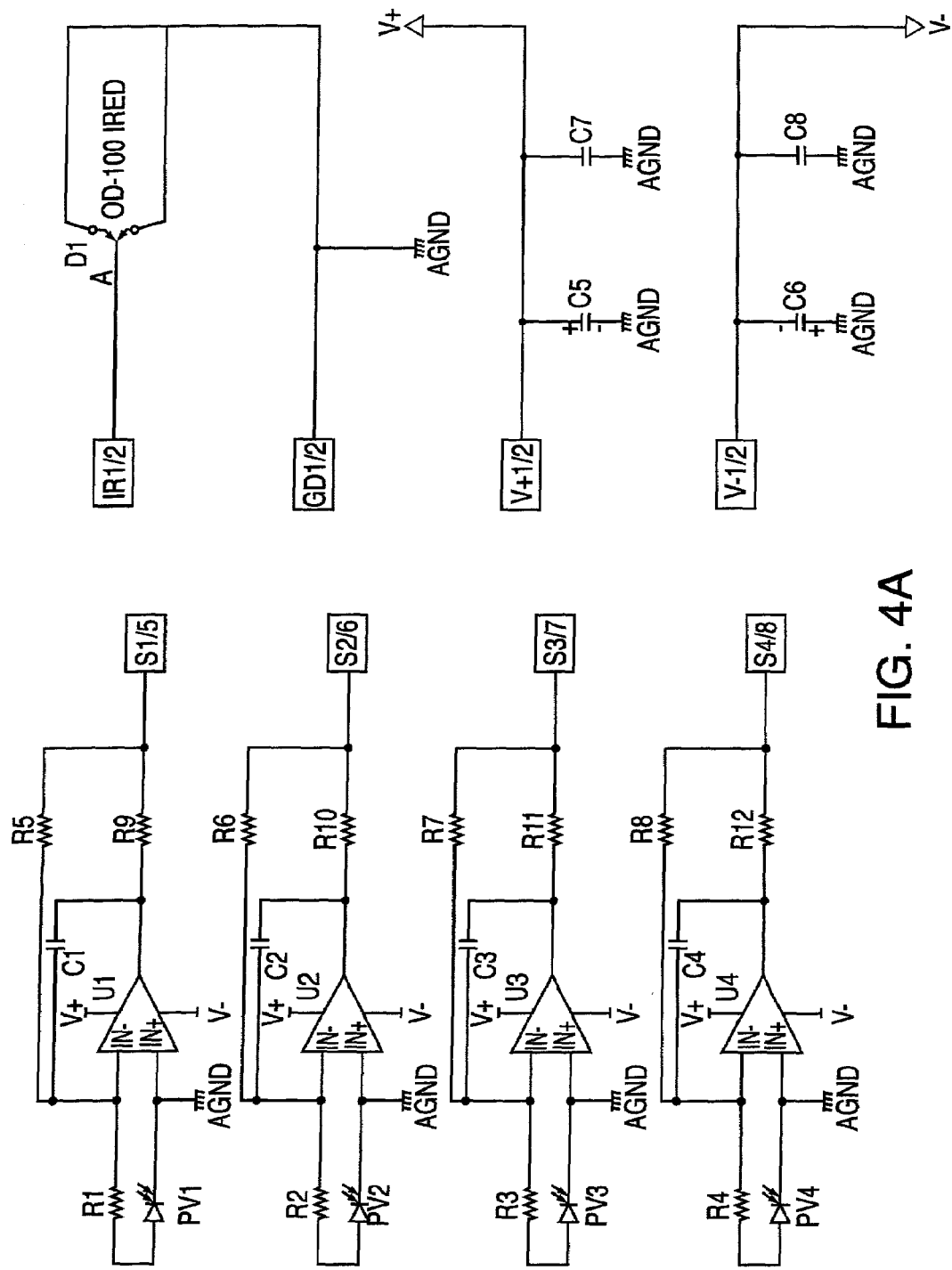
FIG. 4A is a circuit diagram of an example of on-board circuit for the head and monitor remote units.
Figure 4B:
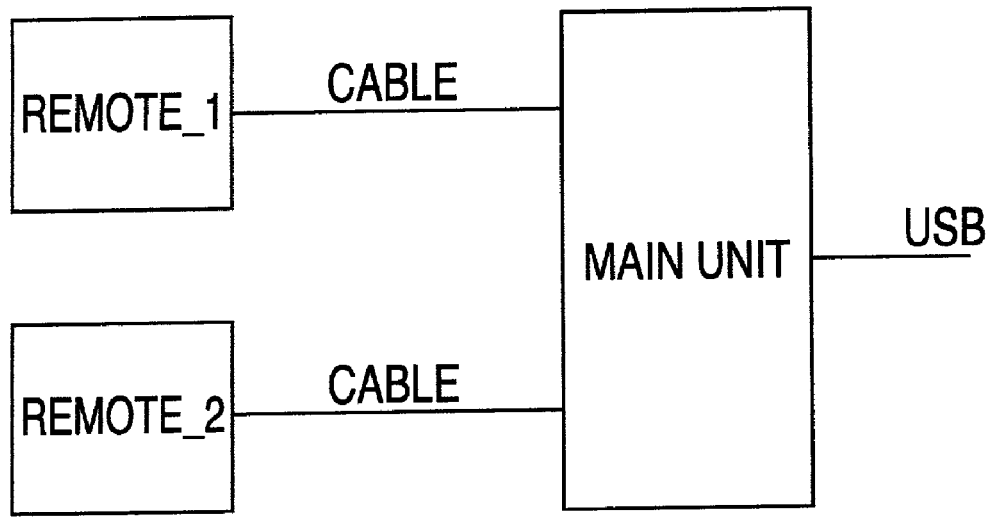
FIG. 4B is a schematic diagram of the interconnection of components for the electronics hardware of the device.

Referring to FIG. 4B, the device electronics hardware consists of two identical remote boards, Remote 1 and Remote 2, that are mounted respectively with the headset and monitor units and cabled to a Main Unit which is a self-powered USB peripheral device. USB refers to Universal Service Bus, which is a common data bus standard and communication protocol for universally handling diverse peripheral devices promoted by Microsoft Corp. As shown in FIG. 4A, each remote board contains the circuitry to power the 4 identical PV cells and IRED infrared diode and to convert the PV cell currents to output voltage signals. An instrumentation op amp (LT1468) accepts the current signal from the PV cell and converts it into a voltage for transmission down the interconnection cable. There is a 33-ohm series resistor to filter noise from the high impedance IN- input. A 33-ohm series resistor is also used on Vout since the op amp is driving a high capacitance cable. The 40K feedback resistor sets the I-to-V gain. A 220 pF capacitor sets the high frequency roll-off of the op-amp. The only other components in the remote unit are power supply decoupling capacitors (a 10 uF tantalum and a 0.1 uF ceramic on +5v and −5v) and the IRED.

Figure 4C:
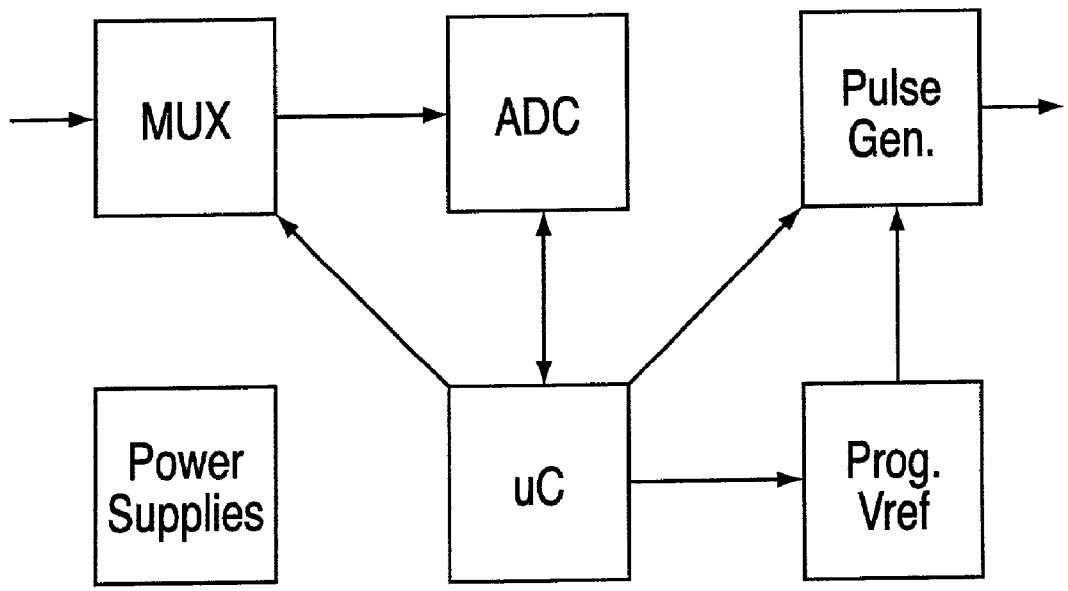
FIG. 4C is a schematic diagram of the components of the IC motherboard of the processor module.

Referring to FIG. 4C, the Main Unit has an IC motherboard which contains six main functional sections, i.e., a microcontroller uC, multiplexer MUX, analog-to-digital converter ADC, dual pulse generator circuits, reference voltage Vref, and power supply. The microcontroller uC interfaces to the USB and uses the Start-Of-Frame signal as its timing reference. The uC generates the wave forms required to select the correct input channel via the MUX, initiate and read 16-bit values from the ADC and create pulses for the IREDs in each of the remote units. Each data collection cycle gathers 16 16-bit values every micro second (4 "dark" from remote__1, 4 "light" from remote__1, 4 "dark" from remote__2, 4 "light" from remote__2). Two sets of these values (32 bytes) are formed into an HID report that is prepared for the PC host every 2 msec. The uC uses a standard 12 MHz crystal. A detailed circuit diagram of the main board is shown in FIG. 4D.

The input signals from the remote boards are noise-filtered and applied to the microcontroller uC which sends them to the ADC for conversion to 16-bit value in 10 us. Each of the two identical pulse generator circuits is an amplifier that generates an output current (for the IRED) that is proportional to the input voltage (Vref). The Main Unit can be powered from the 5V power line of a standard USB cable, however this requires certain restrictions during the various modes of operation (enumeration, run-time, suspend). A step down unit generates 3.3V for the microcontroller. When in the Off state, no voltages are generated for the ADC or pulse generators. This reduces the system's power consumption to below 100 mA for an active microcontroller.

Conversion of PV Cell Response Values to Position/Angle Values

Figure 5A:
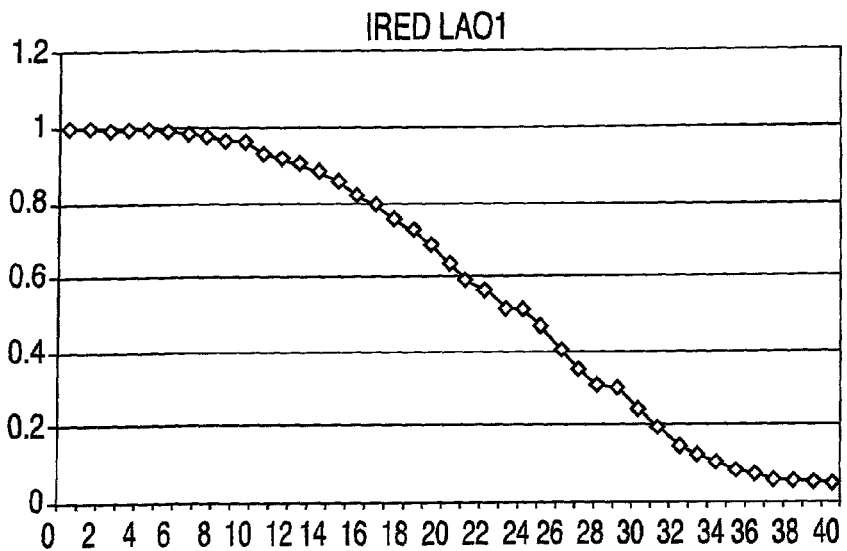
FIG. 5A is a chart illustrating the lamp-angle-of-incidence (LAOI) effect of PV cell response from the center to the edges of an IRED light beam.

There are three main light-input-to-PV-cell-response characteristics that need to be taken into account to derive accurate position and angle values for the position and angle of the movable unit of the complementary emitter/detector pair. First, as one deviates from the center of the light beam pattern (i.e., going from directly facing the IRED array out toward the edges), the intensity of the light decreases rapidly. If the orientation angle of the light beam source is turned, the PV cell response is correspondingly affected. This is referred to herein as the "lamp-angle-of-incidence" (LAOI) or "offset" effect. This is a first major effect that must be accurately measured and modeled in order to solve for the position and angle values. The LAOI characteristic is illustrated in FIG. 5A showing the decrease in light intensity as one deviates from a reference value of 1 at zero degrees directly facing the IRED array to about 60% at about 20 degrees from the center.

Figure 5B:
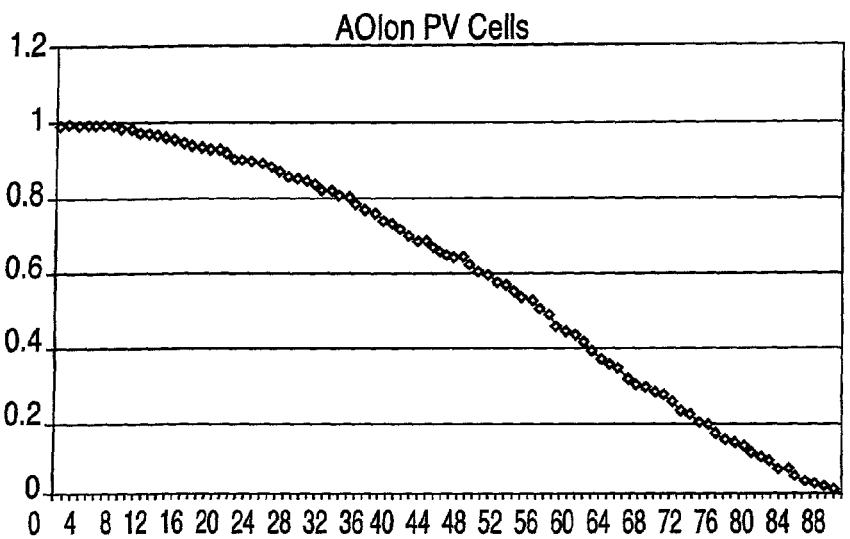
FIG. 5B illustrates the angle-of-incidence (AOI) effect as the angle of light incidence on the PV cells increases from straight on to steeper angles.

Second, the PV cell response decreases as the angle of incidence of light onto the PV cell detection surface increases. This is referred to as the "angle-of-incidence" (AOI) effect, which is illustrated in FIG. 5B. The cell response decreases from a reference value of 1 at zero angle-of-incidence (straight on) to about 60% as the angle of incident light on the PV cells increases to about 45 degree angle of incidence.

Figure 5C:
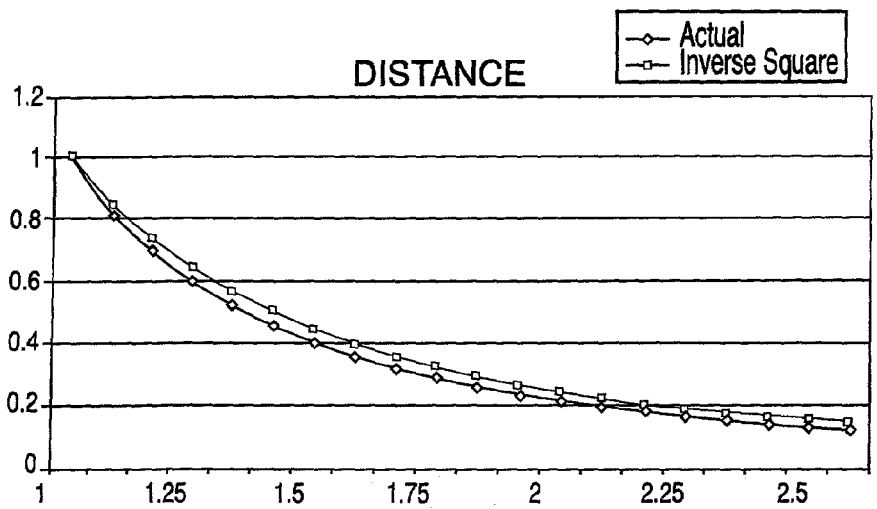
FIG. 5C illustrates the inverse square relation of PV cell response with distance.

Third, the distance effect of the PV cell response to the light source closely follows the "inverse-square law", as illustrated in FIG. 5C. The cell signal decreases from a reference value of 1 at a reference distance of 1 to about 60% at a distance of 1.25 times the reference distance.

PV cell short-circuit currents (i.e., the maximum amount of current or amperage produced by the cell; also known as "Isc" current) are extremely sensitive to changes in the angle-of-incidence to a light source and distance to that light source. The present invention makes use of these sensitivities to derive the position and angle information based on the PV cell response signals. These sensitivities can be plotted curvilinearly and curve-fit formulas can be derived to model their effects. Although theoretically identical, slight differences in these relationships would be encountered using various PV cell and IR lamp/laser combinations. Once the cell/light-source relationship is accurately characterized through calibration measurement, these relationships remain stable. Photodiodes exhibit similar behavior in this angle/distance relationship to PV cells.

By sensing the ratio of Isc currents between paired cells (or photodiodes) on the headset (the up/down and left/right cell/photodiode pairs), the relevant vertical and horizontal angles to the normal axis of the infrared light source can be calculated using a functional relationship determined through measurement. Further, by using the magnitude of the Isc currents produced by all the respective cells/photodiodes, the distance between the headset and monitor-top device can be calculated. Finally, using standard trigonometric identities and the calculated angle and distance estimates, the user's head location can be correspondingly calculated and transposed into X, Y, Z coordinates relative to a "zero" position in front of the computer monitor, and the headset-to-monitor angles can be transposed to derive the orientation angles from the X and Y axes of the headset unit relative to the monitor unit.

A suitable position/angle solution method must convert the PV cell response outputs, representing incident light intensity detected at each cell, into values accurately representing the position and angle of the movable unit relative to the stationary unit. As one preferred approach, an exemplary position/angle solution routine is characterized by:

(i) building a software model or simulation of the "lamp-angle-of-incidence" (LAOI) effect, "angle-of-incidence" (AOI) effect, and "inverse-square-of-distance" (Distance) effects of the device;

(ii) finding a "best fitting" polynomial solution equation by curve-fitting the modeled device outputs to a calibration set of raw cell signal outputs to derive a "best fit" solution set of polynomial coefficients;

(iii) dividing the solution space into a plurality of solution cells extending across the angular and distance ranges for use of the device;

(iv) solving for "best fit" solution sets of polynomial coefficients for all of the cells of the solution space;

(v) storing the solution sets of polynomial coefficients with the software driver to be used with the device;

(vi) during operational use of the device, retrieving the stored solution set of polynomial coefficients corresponding to the solution cell addressed by the PV cell response values at a particular location of the headset unit being detected;

(vii) applying the coefficient set to the curve-fitting polynomial to derive the solution values for distance and orientation angles for the particular headset location being detected; and (viii) converting these solution values to standard position/angle values for the peripheral device that can be used by the software driver for 3D navigation control of the application program.

Example: Curve-Fit Solution Method

The current signal response output of each PV cell varies according to the lamp-angle-of-incidence (LAOI), angle of incidence (AOI) to the PV cell detection surface, and inverse square of the distance from the light source. Each of these effects is entirely predictable, and can be estimated for any point once an adequate sampling of raw output values of the PV cell has been measured at sample calibration points. As a result, the output of a PV cell at any point within the operational range can be modeled as follows:

Cell_Output=Distance_Effect*Angle_Incidence_Effect*Offset_Effect

Using this modeling of PV cell outputs, a simulation of PV cell response values was created in order to derive a "training set" of simulated values for the PV cell output. A software simulation program was written to simulate the PV cell responses for various positions of the light source (of the movable unit) in space and calculating the relative cell outputs. Writing a simulation program given the modeled relationship of cell output to distance, angle-of-incidence, and offset effects is deemed to be familiar to those skilled in this field, and is not described in further detail herein. Using the simulation program, training files were calculated for relative PV cell outputs at 1,000 random spatial positions. The training set was then used to work backwards to find what the inputs to the simulation had been at each position. It should be noted that before the above-described solution routine is started, each cell output must be multiplied by a calibration factor which has the effect of normalizing each of the cell outputs. Each cell output must be measured under identical conditions, and the average of the 8 cells derived. The calibration multiplier for each cell is the multiple that reduces the cell output to the average value.

Figure 6:
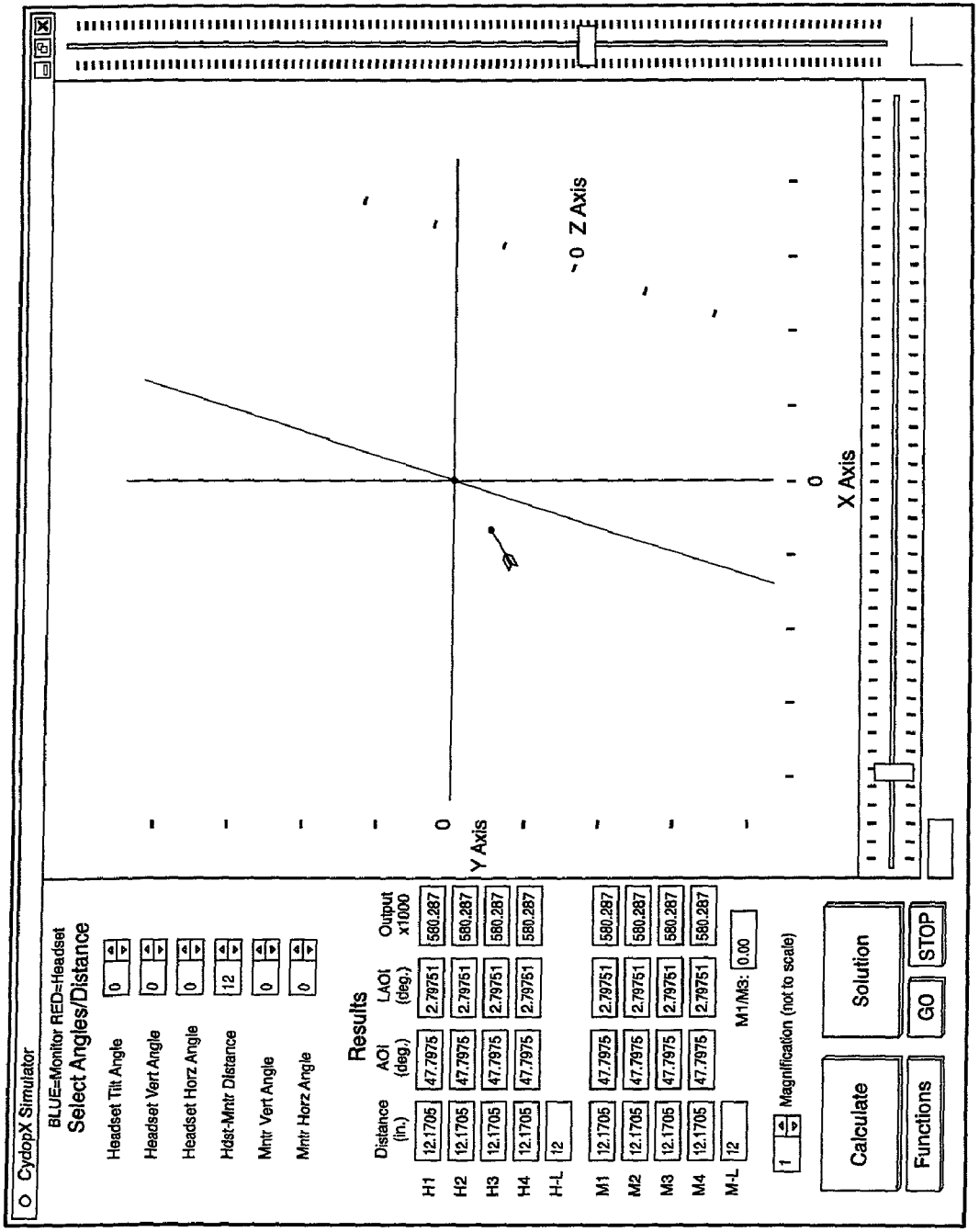
FIG. 6 is a screen shot showing an example of operation of a software simulation program to derive an empirical "curve-fit" solution equation for orientation angles and position from the PV cell response outputs for the 3D navigation device.

In FIG. 6, a screen-shot of the interface for a software simulation program is shown for modeling the solution inputs of the device. A user can vary the angles and location of the headset unit. The cells are identified in the left-hand column as H1-H4 for the headset unit, and M1-M4 for the monitor unit. The cell numbering proceeds from the top and increments in a clockwise manner facing the assembly. Each cell has an output response value for distance, AOI, and LAOI. The effect of these factors is then reflected in the relative cell output (shown as ×1000) of each cell. The performance of the device can be effectively characterized in this manner. A routine is created for to vary the angle and distance values 1,000 times and record these inputs, along with the cell outputs, in a text file. By "fitting" through curve-fits or similar mathematical methods, the inputs can be modeled to the outputs in order to derive an economical solution routine.

The simulation showed that the effective range of all angles of the device is about 14 degrees in any direction and an optimal distance for the headset of about 10 to 18 inches from the monitor unit. This was concluded based on realistic levels of cell outputs at each extreme likely to still produce a correct solution. A text training file was then created that randomly varied all angles between −14 and +14 degrees and distances between 10 and 18 inches and recorded these values and the cell outputs.

As a best guess, the inputs were taken to be ratios of the difference in outputs of pairs of cells to the sum of the cells. It turned out that these ratios had a high correlation to the solution values (distance and angle values) being solved for. An example of such a ration is as follows:

Ratio1=$(M1-M3)/((M1+M3)+0.000001)$

This is the ratio of the difference to the sum of output values for Cell 1 of the monitor-top unit to Cell 3. As the PV cells are numbered clockwise from the top, this represents the ratio of difference and sum values of the top PV cell and the bottom PV cell. If the top cell is receiving more light, then a positive ration indicates that the user's head is above the monitor device. Therefore, this ration can be taken as one possible input that should have a high correlation to a solution equation for the Monitor Vertical Angle. Using this approach in trial and error fashion, 3 other ratios were identified as high correlation inputs to the solution equation for Monitor Vertical Angle:

Ratio2=$(H1-H3)/((H1+H3)+0.000001)$

Ratio3=$(M1-M2)/((M1+M2)+0.000001)$

Ratio4=$(M2-M3)/((M2+M3)+0.000001)$

Therefore, ACT_MVA=funcMVA(MVAx), which is a function call for the ratios in array MVAx Standard curve-fitting software was then used to find a "best fitting" curve which produced a high correlation between a solution for the Monitor Vertical Angle (MVA) and these four ratios. An example of such software is sold under the product name Datafit 7.0 by Oakdale Engineering Corp., Oakdale, Pa., which offers 177 standard polynomial expansion equations for possible curve fitting solutions. By trial-and-error testing of the standard set, the following polynomial expansion equation (doubled for 4 input variables over the standard set for 2 variables) was identified as producing a very high correlation between MVA and the 4 ratios:

$$MVA = a + b*X_1 + c*X_2 + d*X_1^2 + e*X_2^2 + f*X_1*X_2 + g*X_1^3 + h*X_2^3 + i*X_1*X_2^2 + j*X_1^2*X_2 + k + 1*X_3 + m*X_4 + n*X_3^2 + o*X_4^2 + p*X_3*X_4 + q*X_3^3 + r*X_4^3 + s*X_3*X_4^2 + t*X_3^2 X_4$$

$X_1$ to $X_4$ are the four ratios described above. The letter variables "a" to "t" are the coefficients to the equation which are derived by the curve-fitting software.

A similar approach was taken to finding high correlation ratios as inputs and to solve for the polynomial expansion equation coefficients for Monitor Horizontal Angle (MHA), Headset Vertical Normal Angle (HVNA), and Headset Horizontal Nonnal Angle (HHNA), as follows:

Monitor Horizontal Angle:

MHAx(1)=$(M2-M4)/((M2+M4)+0.000001)$

MHAx(2)=$(H2-H4)/((H2+H4)+0.000001)$

MHAx(3)=$(M1-M2)/((M1+M2)+0.000001)$ $MHAx(4)=(M2-M3)/((M2+M3)+0.000001)$ $ACT\_MHA=\text{func}MHA(MHAx)$

Headset Vertical Angle (to Normal):

$HVNAx(1)=(H1-H3)/((H1+H3)+0.000001)$ $HVNAx(2)=(M1-M3)/((M1+M3)+0.000001)$ $HVNAx(3)=(H2-H3)/((H2+H3)+0.000001)$ $HVNAx(4)=(H1-H2)/((H1+H2)+0.000001)$ $ACT\_HVNA=\text{func}HVNA(HVNAx)$

Headset Horizontal Angle (to Normal):

$HHNAx(1)=(H2-H4)/((H2+H4)+0.000001)$ $HHNAx(2)=(M2-M4)/((M2+M4)+0.000001)$ $HHNAx(3)=(H2-H3)/((H2+H3)+0.000001)$ $HHNAx(4)=(H1-H2)/((H1+H2)+0.000001)$ $ACT\_HHNA=\text{func}HHNA(HHNAx)$ The headset angle relative to "normal" stands for the vertical and horizontal angles of the headset unit's "view" of the monitor unit relative to the normal axis of the headset. To convert these angles to the final values for the Headset Vertical and Horizontal orientation angles from the X and Y rotational axes relative to the X reference axis, i.e., which is the direction of the Normal axis of the monitor-top unit, the following adjustment is made:

$ACT\_HVA=ACT\_HVNA+ACT\_MVA$ $ACT\_HHA=ACT\_HHNA+ACT\_MHA$

The final Headset Position values along the X, Y, Z coordinate axes for the headset unit relative to the monitor unit can be derived from the solutions for the orientation angles MVA and MHA to the headset unit and the distance of the headset unit relative to the monitor unit. A distance solution was found using the following 4 inputs to the polynomial expansion equation:

$DISTx(1)=SumHao$ $DISTx(2)=SumMao$ $DISTx(3)HLAOI\text{ effect}$ $DISTx(4)=MLAOI\text{effect}$ $ACT\_DIST=\text{func}DIST(DISTx)$ These input factors were calculated as follows:

$ACT\_HLAOI=Atn(Sqr(Tan(ACT\_MVA)^2+Tan(ACT\_MHA)^2))$ $ACT\_MLAOI=Atn(Sqr(Tan(ACT\_HVNA)^2+Tan(ACT\_HHNA)^2))$ $HLAOI\text{effect}=LAOIa*ACT\_HLAOI^8+LAOIb*ACT\_HLAOI^7+LAOIc*ACT\_HLAOI^6+LAOId*ACT\_HLAOI^5+LAOIe*ACT\_HLAOI^4+LAOIf*ACT\_HLAOI^3+LAOIg*ACT\_HLAOI^2+LAOIh*ACT\_HLAOI+LAOIi$ $H1AOI=Atn(Sqr(Tan((ACT\_HVNA+0.52359))^2+Tan(ACT\_HHNA)^2))$ $H2AOI=Atn(Sqr(Tan((ACT\_HVNA))^2+Tan((ACT\_HHNA+0.52359))^2))$ $H3AOI=Atn(Sqr(Tan((ACT\_HVNA-0.52359))^2+Tan(ACT\_HHNA)^2))$ $H4AOI=Atn(Sqr(Tan((ACT\_HVNA))^2+Tan((ACT\_HHNA-0.52359))^2))$ $H1AOIe=AOIa*H1AOI^5+AOIb*H1AOI^4+AOIc*H1AOI^3+AOId*H1AOI^2+AOIe*H1AOI+AOIf$ $H2AOIe=AOIa*H2AOI^5+AOIb*H2AOI^4+AOIc*H2AOI^3+AOId*H2AOI^2+AOIe*H2AOI+AOIf$ $H3AOIe=AOIa*H3AOI^5+AOIb*H3AOI^4+AOIc*H3AOI^3+AOId*H3AOI^2+AOIe*H3AOI+AOIf$ $H4AOIe=AOIa*H4AOI^5+AOIb*H4AOI^4+AOIc*H4AOI^3+AOId*H4AOI^2+AOIe*H4AOI+AOIf$ $H1ao=(H1/HLAOI\text{effect})/H1AOIe$ $H2ao=(H2/HLAOI\text{effect})/H2AOIe$ $H3ao=(H3/HLAOI\text{effect})/H3AOIe$ $H4ao=(H4/HLAOI\text{effect})/H4AOIe$ $SumHao=H1ao+H2ao+H3ao+H4ao$ $MLAOI\text{effect}=LAOIa*ACT\_MLAOI^8+LAOIb*ACT\_MLAOI^7+LAOIc*ACT\_MLAOI^6+LAOId*ACT\_MLAOI^5+LAOIe*ACT\_MLAOI^4+\_LAOIf*ACT\_MLAOI^3+LAOIg*ACT\_MLAOI^2+LAOIh*ACT\_MLAOI+LAOIi$ $M1AOI=Atn(Sqr(Tan((ACT\_MVA+0.52359))^2+Tan(ACT\_MHA)^2))$ $M2AOI=Atn(Sqr(Tan((ACT\_MVA))^2+Tan((ACT\_MHA-0.52359))^2))$ $M3AOI=Atn(Sqr(Tan((ACT\_MVA-0.52359))^2+Tan(ACT\_MHA)^2))$ $M4AOI=Atn(Sqr(Tan((ACT\_MVA))^2+Tan((ACT\_MHA+0.52359))^2))$ $M1AOIe=AOIa*M1AOI^5+AOIb*M1AOI^4+AOIc*M1AOI^3+AOId*M1AOI^2+AOIe*M1AOI+AOIf$ $M2AOIe=AOIa*M2AOI^5+AOIb*M2AOI^4+AOIc*M2AOI^3+AOId*M2AOI^2+AOIe*M2AOI+AOIf$ $M3AOIe=AOIa*M3AOI^5+AOIb*M3AOI^4+AOIc*M3AOI^3+AOId*M3AOI^2+AOIe*M3AOI+AOIf$ $M4AOIe=AOIa*M4AOI^5+AOIb*M4AOI^4+AOIc*M4AOI^3+AOId*M4AOI^2+AOIe*M4AOI+AOIf$ $M1ao=(M1/MLAOI\text{effect})/M1AOIe$ $M2ao=(M2/MLAOI\text{effect})/M2AOIe$ $M3ao=(M3/MLAOI\text{effect})/M3AOIe$ $M4ao = (M4/MLAOI\text{effect})/M4AOIe$ Sum $Mao = M1ao + M2ao + M3ao + M4ao$ The derivation of the above calculations for the Distance value is complex, and reference is made to the "Source Code for Position/Angle Solution" appended hereto as Appendix I for further detail.

After solving for the orientation angles and the distance of the headset unit relative to the monitor unit, they must be trigonometrically transposed into the true forward facing angles and X, Y, Z coordinates relative to the monitor, which is the standard format to be used by the software device driver as final outputs of the peripheral device to the application program. The distance translation into X, Y, Z coordinates is calculated using well known trigonometric relations, as follows:

MONITOR Z TRANSLATION

H2LZ=ACT_DIST

MONITOR X TRANSLATION

ANG=ACT_$_{MVA}$

OldZ=H2LZ

NewY=OldY *Cos(ANG)–OldZ*Sin(ANG)

NewZ=OldY*Sin(ANG)+OldZ*Cos(ANG)

H2LY=NewY

H2LZ=NewZ

MONITOR Y TRANSLATION

ANG=ACT_MHA

OldY=H2LY

OldZ=H2LZ

NewX=OldZ*Sin(ANG)+OldX*Cos(ANG)

NewZ=OldZ*Cos(ANG)–OldX*Sin(ANG)

H2LX=NewX

H2LZ=NewZ (Reference is made to the source code listing in Appendix I for further detail.)

As a further refinement to increase speed and accuracy of the system, the same curve-fitting solution routine is used, except that the solution space is divided into a 3-dimensional array of solution segments and a set of coefficients is calculated for each segment and stored in memory. This in effect allows the solution equation to be adjusted across the operational ranges of the device, so that slightly different PV cell responses in different directions or distances can be modeled individually, rather than be compelled to use a single set of equation coefficients. This would allow the curve-fitting process to more accurately model very small segments of the solution space, deriving much more accurate results.

The array of segments can be addressed by Vertical Angle, Horizontal Angle, and Distance, which correlate approximately to the M1/M3 ratio, H2/H4 ratio, and sum of the PV cells raw values. Thus, for example, the M1/M3 ratio (corresponding to monitor vertical angle) can span a range divided into 10 segments, the H2/H4 ratio (corresponding to headset horizontal angle) can be divided into 10 segments, and the sum of PV cells raw values (corresponding to headset distance) can be divided into 10 segments. Thus, the 3-D array has 10*10*10=1000 segments. Each of the segments has a corresponding set of coefficients values for the MVA, MHA, HVA, HHA, and Distance solution values as described above. With 20 coefficients ("a" to "t") for each solution equation, 20*5=100 data sub-spaces must be allotted per segment.

To calculate coefficient sets for multiple segments, a commensurately expanded training set of simulation values needs to be created. For example, the simulation program may be used to create 12,000 random positional samples for 1,000 segments or 240,000 samples for 10,000 segments. These samples are handled by a coefficient calculation routine which automatically segments the training data into bins corresponding to the 3D coefficient array based on the M1/M3 ratio, H2/H4 ratio, and PV sum values. The values for each bin/segment are curve-fit to the equation in order to derive the best-fit coefficients. These are stored in a database for use by the software device driver at startup to load these files.

The above multi-segment solution routine requires the use of non-linear multiple regression, which is a most difficult form of curve-fitting. The standard method for solving non-linear multiple regression is known as the Levenberg-Marquardt Algorithm. For further explanation of this algorithm, reference is made to the publication entitled "Numerical Recipes in FORTRAN", published by Cambridge University Press, 1992.

The above example of a curve-fitting solution routine is found to be stable for the operational ranges of the device used as an input to control a computer display running PC-level applications programs and operated at a normal desktop distance. It is characterized by a medium level of CPU usage (about 1% of typical processing capacity of a Pentium II class processor), low level of RAM memory usage, and low to medium level of accuracy which is satisfactory for PC-level applications and games. However, other approaches may be used which may be preferred under different circumstances. For example, for computer aided design (CAD) uses, an iteration approach to recalculating solution values using a larger set of input variables for convergence on a unique value would require a high level of CPU usage and low level of RAM memory, but produce a high level of accuracy. This approach is suitable where processing capacity is high, and high accuracy is needed. Another approach is to use a large look-up table of pre-calculated and/or measured values, which would be characterized by high RAM memory requirements, high speed, but fairly low accuracy since the number of stored values must be kept relatively low, e.g., a 100K value set, in order to keep initial calibration and enduser memory requirements manageable). A neural network circuit or software may also be used where individual PV cell response values are expected to have wide variability but collectively would converge on unique solutions.

Use of Position/Angle Values for 3D Navigtion

The position values on X, Y, Z coordinates and headset orientation angles on X and Y rotational axes derived as described above provide accurate control inputs for navigation in 5 degrees of freedom. Full six degrees of freedom navigation can be obtained by adding a tilt sensor or other device to measure rotation of the head or other user body part on which the movable unit is worn and calculating the "roll" value from the X rotational axis. These control inputs can be used by an application program developer to control a wide range of 3D movement and camera or view angle change functions in the the application program. These functions are typically stored in function libraries and retrieved by calls made by the application program. For example, the user head position values can be used to control movements in 3D space, and the head orientation values can be used to control camera angle of the display. Also, the amount or speed of head movement may control the speed of movement. For example, a 5 degree angle shift could result in panning to the right slowly, whereas a 20 degree angle shift could create a quickly moving pan. The software developer may choose to alter sampling rates for applications requiring different modes of interaction with or monitoring of the display, e.g., a relatively low sampling rate for smooth motion effects in a game, or a high sampling rate with averaging or smoothing techniques for jitter-free device or instrument control.

The 3D navigation system is particularly suitable to control the movements and view angle of a character in 3D game environments. In current game control methodology, the user has a calibrated "zero" or rest position. Movement of the controller in a direction away from the zero position results in movement of the character in the game in that direction, whereas "return-to-zero" causes the character to stop. By the user shifting their head position with the 3D navigation system of the invention, the 3D character's movements in the game can be controlled while leaving the user's hands free to manipulate other game controls, such as fighting methods or the use of weapons. Shifting the head position Left, Right, Forward or Backward would elicit corresponding movements in those directions. Values derived by moving the head position up and/or down may also be utilized by the software developer, for example, the 3D character can be made to "fly" with an "Up" head movement, or to "crouch down" with a "Down" head movement. The amount or speed of head movement may be used to control the speed of character movement within the game.

In contrast to head positional movement, changes in head orientation angle of the headset unit can be used to control the camera or view angle of the character in the 3D game environment. For example, rotation of the user's head to the Left or Right can be used to cause the camera angle to pan correspondingly left or right. Panning followed by return-to-zero rotation of the user's head (return to looking straight ahead at the monitor) can be used to shift and hold the camera angle in the new view direction. A software developer could implement different panning speeds by sensing the magnitude or speed of the head angle shift. For example, a 5 degree angle shift could result in panning slowly, whereas a 20 degree angle shift or a quick shift movement could create a quickly moving pan. In a fluid, lifelike manner, head position and angle shift commands can easily be combined, thus providing a new dimension and sensitivity to 3D game navigation and hands-free control. Another desirable function might be to click on an object or to magnify it when the user makes a pre-determined head gesture, such as nodding.

In a fluid, lifelike manner, commands can easily be combined. For example, the user could be moving forward and also decide to look to the left slightly and remain moving. This and more advanced actions would take agility and practice on the part of the user in manipulating their characters, thereby enhancing their appreciation and interest in 3D gaming. The 3D navigation system allows accurate detection of head position in 3D space as well as head angle shifts on 3 axes, thereby providing hands-free navigation control with true six degrees of freedom. As a result of the above, a game enthusiast could interact with the character control within a 3D game in a much more lucid and exciting manner than current methods. This device allows 3D character game manipulation of a new dimension and sensitivity.

For controlling PC software through a USB connection, the device cannot directly communicate axis values from the device over the USB cable to the PC, as with other HID USB devices. The driver must be responsible for receiving raw USB PV cell signal values. The USB microcontroller would be feeding raw PV cell signal values at a constant rate to the driver. This rate will be enough for approximately 50 positional updates per second. Each positional update will require approximately ~400 bits of data transfer over the USB cable.

Upon receiving positional update data from the USB, the driver would call the solution algorithm. The solution algorithm could be either a code module in the driver, or a code module contained within a separate kernel-mode d11. The solution algorithm would return the absolute and (modified) true coordinates/angles of the user's head in front of the monitor subject to the user zeros. This solution code, on startup, would read factory calibration offsets for each of the PV cells in the device from the system registry. A GUI application would place the necessary calibration values into the registry, and create and store user zeros in the registry on installation. User zeros would account for situations where the user sits "downward" from the monitor (commonly, Y coordinate zero), or closer or further away from the monitor (commonly, Z coordinate zero). The solution code could also compress/stretch axes based on user zeros. For example, if the useful device range in the Y coordinate is –10 inches to +10 inches, and the user ads zeros this axis at –2 inches, the output range 0 to –10 would be "compressed" into the space between true –2 and –10, to preserve the full useful output range of the device.

The solution data passed back to the driver would be further massaged by what could be termed "profile code". The driver would thus in turn call another code module/kernel mode dll containing this "profile code" with the axis solution. This profile code would ideally contain an API and numerous variables that could be changed by external calls. The profile code would be capable of numerous manipulations and derivations of the received axis solution data, for example:

1. Axes could be remapped. For example, the X axis becomes the Y axis and the Y axis becomes the X axis.
2. Axis values can be remapped on different linearities, for example the X axis could be remapped from a linear relationship to an exponential or logarithmic one. This is useful for creating inputs that work best with certain games.
3. If certain numeric/timing conditions are met, keystrokes could be generated. Certain games rely on keystrokes which could be created by programmatic conditions.
4. Mouse movements could be created, as well as mouse button clicks.
5. Additionally, the profile code would be capable of computing selectable moving averages of axis data to aid is smoothing of positional data. Other advanced noise reduction and axis improving techniques would be possible here.

Using these options, the software licensor or game developer could create profiles best suited to match the device inputs to specific games on the market. Also, a device profile could be created to use head input to control a cursor on the display, to enable a disabled person to operate a computer with head movements. Using stored profiles, the device could be adjusted to work with virtually any game or other software package by the user. This would allow shortening the time needed by users to use the device with their particular applications or usage environments, for example, by offering profiles for download from a website. Advanced users would have the greatest degree of flexibility in controlling the device.

The 3D navigation system may also be used for "hands-free" control in a wide range of other 3D applications. It may be used to control flight motions and display views in the cockpit of an aircraft, or the command center of a naval vessel, spaceship, land vehicle, etc. Leaving the user's hands free allows for simultaneous control of other functions, such as manipulation of a control panel or the firing of weapons. For disabled persons, the 3D navigation system can be used to guide the directional movements of a motorized wheelchair as well as ascending, descending, swiveling and tilting movements. The 3D navigation system may also be used to control various functions in an industrial environment, for example, guiding the machine-assisted movement and orientation of a workpiece while leaving the hands free to manipulate process equipment applied to the workpiece (welding, painting, laminating, etc.). The system can similarly be used in CAD design, architectural, medical, and virtual reality applications. For example, use of the headset with a virtual reality display monitor can allow a 3D "tour" to be taken moving through 3D constructions, buildings, medical images, and simulated or artificial environments, with lifelike angle shifts of the user's head simulating corresponding changes in view.

The movable unit could also be mounted on eyewear worn by user, headphones, the shoulder, wrist, or other part of the body, and the stationary unit may be formed integrally with the display monitor or in a control panel on the keyboard or desk facing the user, etc. The emitter/detector units need not be identical. For example, the infrared emitters of the two units may emit infrared beams at different power or with different cone angles, or the PV cell detectors may operate at different sampling rates. The head unit may be battery powered and transmit its raw output values by wireless transmission to the processor module, in which case using a lower powered or narrowed beam and lower sampling rate may be used to reduce battery power consumption. Other emitter and detector technologies may also be used, such as other types of spectral light, laser light, ultrasound, electromagnetic pulses, etc.

It is understood that many other modifications and variations may be devised given the above description of the principles of the invention. It is intended that all such modifications and variations be considered as within the spirit and scope of this invention, as defined in the following claims.

I claim:

1. A 3D cursor or joystick device comprising: a complementary pair of emitter/detector units, one of which is mounted on a movable component moved by the user in a 3D space and the other of which is mounted on a stationary component positioned at a reference position facing toward the 3D space in which the user moves the movable component, wherein each emitter/detector unit of the complementary pair has an emitter element for emitting a three-dimensionally distributed signal beam in a direction toward the other unit, and a detector element adjacent the emitter element so as to receive the signal beam from the other unit and provide an output signal representing measured characteristics of the signal beam received from the other unit, wherein only the two output signals of the two detector elements, each detecting the signal beam from the emitter element of the other one of the complementary pair of emitter/detector units at opposite endpoints defining a single line between the two emitter/detector units, are used in combination together to calculate position and orientation angle values for the emitter/detector unit of the movable component relative to the emitter/detector unit of the stationary component.

2. A 3D cursor or joystick device according to claim 1, further comprising a processor module for receiving the output signals of the complementary pair of emitter/detector units and generating a device output of the calculated position and orientation angle of the movable component relative to the stationary component.

3. A 3D cursor or joystick device according to claim 2, wherein the processor module is coupled to a computer running a 3D application program and provides the device output to the computer to be used as a cursor or joystick control input to the 3D application program.

4. A 3D cursor or joystick device according to claim 1 which is used to control a 3D flight or navigation simulation program.

5. A 3D cursor or joystick device according to claim 1 which is used to control a 3D command and control application program.

6. A 3D cursor or joystick device according to claim 1 which is used for hands-free input to an assistive application program for a disabled person.

7. A 3D cursor or joystick device according to claim 1 which is used for controlling machine movement in an industrial environment.

8. A 3D cursor or joystick device according to claim 1 which is used for controlling user input to a CAD or 3D graphics application program.

9. A 3D cursor or joystick device according to claim 1 which is used for controlling user input to a virtual reality application program.

10. A 3D cursor or joystick device according to claim 1, wherein the movable component is attached to a part of the user's body and controlled by moving that part of the body in the 3D space in front of the stationary component and without the requiring operation by the user's hands.

11. A 3D cursor or joystick device according to claim 10, wherein the movable component is a headset mounted on the user's head, and the stationary component is a monitor module mounted in proximity to a display monitor facing toward the user.

12. A 3D cursor or joystick device according to claim 1, wherein the emitter/detector units of the complementary pair are of the same construction and operate with the same characteristics.

13. A 3D cursor or joystick device according to claim 1, wherein each emitter/detector unit has at least one photodetector as the detector element comprising at least two planar photodetector cells and at least one light source having an axially symmetric light intensity distribution as the emitter element.

14. A 3D cursor or.joystickdevice according to claim 1, wherein each emitter element emits an axially symmetric light beam centered on the unit's axis N in a direction toward the other unit, and each detector element is sensitive to light intensity and intensity differences of the light received, which are indicative of angle-of-incidence of and distance to of the emitter light source.

15. A 3D cursor or joystick device according to claim 1, wherein each emitter element emits a light beam in a direction toward the other unit, and each detector element is comprised of an array of photodetector cells that are arranged about the unit's axis N and are inclined at an outward angle to the axis N facing in a direction toward the other unit, so that the position and angle of the source light beam of the other unit relative to the one unit can be calculated.

16. A 3D cursor or joystick control method comprising the steps of:

providing a peripheral device having a complementary pair of emitter/detector units, one of which is mounted on a movable component moved by the user in a 3D space and the other of which is mounted on a stationary component positioned at a reference position facing toward the 3D space in which the user moves the movable component, wherein each emitter/detector unit of the complementary pair has an emitter element for emitting a three-dimensionally distributed signal beam in a direction toward the other unit, and a detector element adjacent the emitter element for receiving the signal beam from the other unit and providing an output signal representing measured characteristics of the signal beam received from the other unit, and obtaining respective output signals of the two detector elements each detecting the signal beam from the emitter element of the other one of the complementary pair of emitter/detector units at opposite endpoints defining a single line between the two emitter/detector units and using only the two output signals of the complementary pair of emitter/detector units in combination together to calculate position and orientation angle values of the emitter/detector unit of the movable component relative to the emitter/detector unit of the stationary component.

17. A 3D cursor or joystick control method according to claim 16 which is used to control a 3D flight or navigation simulation program.

18. A 3D cursor or joystick control method according to claim 16 which is used to control a 3D command and control application program.

19. A 3D cursor or joystick control method according to claim 16 which is used for hands-free input to an assistive application program for a disabled person.

20. A 3D cursor or joystick control method according to claim 16 which is used for controlling machine movement in an industrial environment.

21. A 3D cursor or joystick control method according to claim 16 which is used for controlling user input to a CAD or 3D graphics application program.

22. A 3D cursor or joystick control method according to claim 16 which is used for controlling user input to a virtual reality application program.

23. A 3D cursor or joystick control method according to claim 16, wherein each emitter element emits a light beam in a direction toward the other unit, and each detector element is sensitive to light intensity and intensity differences of the light received, which are indicative of angle-of-incidence of and distance to of the emitter light source.

24. A 3D cursor or joystick control method according to claim 16, wherein each emitter element emits a light beam in a direction toward the other unit, and each detector element is comprised of an array of photodetector cells that are arranged about the unit's axis N and are inclined at an outward angle to the axis N facing in a direction toward the other unit, so that the position and angle of the source light beam of the other unit relative to the one unit can be calculated.

\* \* \* \* \*